United States Patent [19]

Chow et al.

[11] Patent Number: 5,134,046
[45] Date of Patent: Jul. 28, 1992

[54] BATTERY WITH METAL FOIL COATED PLASTIC HOUSING

[75] Inventors: Lu Chow; William H. Cook; Seshadri N. Prativadi, all of Fairport, N.Y.

[73] Assignee: Ultralife Batteries, Inc., Newark, N.Y.

[21] Appl. No.: 504,468

[22] Filed: Apr. 4, 1990

[51] Int. Cl.$^5$ .............................................. H01M 2/02
[52] U.S. Cl. ..................................... 429/176; 429/185
[58] Field of Search ................... 429/176, 177, 185

[56] References Cited

U.S. PATENT DOCUMENTS

| | | | |
|---|---|---|---|
| 3,738,860 | 6/1973 | Von Roda et al. | 117/95 |
| 3,871,921 | 3/1975 | Beatty et al. | 136/111 |
| 4,194,061 | 3/1980 | Land et al. | 429/82 |
| 4,209,574 | 6/1980 | Ruetschi | 429/133 |
| 4,232,099 | 11/1980 | Sullivan | 429/152 |
| 4,429,026 | 1/1984 | Bruder | 429/152 |
| 4,477,544 | 10/1984 | Bruder | 429/160 |
| 4,511,416 | 4/1985 | Karpilov | 429/176 X |
| 4,608,323 | 8/1986 | Zaborvey | 429/176 X |
| 4,623,598 | 11/1986 | Waki et al. | 429/162 |
| 4,719,159 | 1/1988 | Clark et al. | 429/177 X |
| 4,732,825 | 3/1988 | Kamata et al. | 429/162 |

FOREIGN PATENT DOCUMENTS 1578361  8/1969  France ................................. 429/185

Primary Examiner—Stephen Kalafut
Attorney, Agent, or Firm—Lieberman Rudolph & Nowak

[57] ABSTRACT

A battery having a metallic foil coated rigid plastic housing impedes adverse affects on the battery electrolyte.

6 Claims, 2 Drawing Sheets

BATTERY WITH METAL FOIL COATED PLASTIC HOUSING

FIELD OF THE INVENTION

The invention relates to batteries having a plastic housing.

BACKGROUND OF THE INVENTION

The use of a plastic housing for batteries is disclosed, for example in U.S. Pat. No. 4,719,159. Plastic housing for batteries affords several advantages over solid metal housings. Thermoplastic materials are relatively inexpensive. Secondly, plastic can be easily formed into complex shapes for battery housings by extrusion, injection molding, thermoforming or other processes. It is readily bonded to other plastic components to form a leak-proof seal. Also, plastic containers will rupture at relatively low internal pressures, a desirable battery safety feature.

One problem of plastic battery housings is that plastic is permeable to water vapor and organic solvent vapors. The migration of water vapor into a lithium battery and electrolyte solvent out of the battery will generally adversely affect a battery's electrical performance.

SUMMARY OF THE INVENTION

The present invention provides a battery having a metallic foil coated plastic housing. The plastic housing is generally a molded shape and is relatively rigid. The housing is non-malleable. At least four sides of the plastic housing are foil covered. The entire housing, including the bottom thereof, can be foil covered. The foil coated housing is impermeable to water and organic solvent vapors.

DETAILED DESCRIPTION OF THE INVENTION

The invention provides a useful housing for any battery. For purposes of illustration it is applied to a rectangular housing for 9-volt (transistor radio) lithium battery.

The battery housing 1 may be constructed of any thermoplastic material, such as polypropylene or molded glass-filled polypropylene. The battery housing has a thickness of 0.25 to 2.0 mm.

Figure 1:
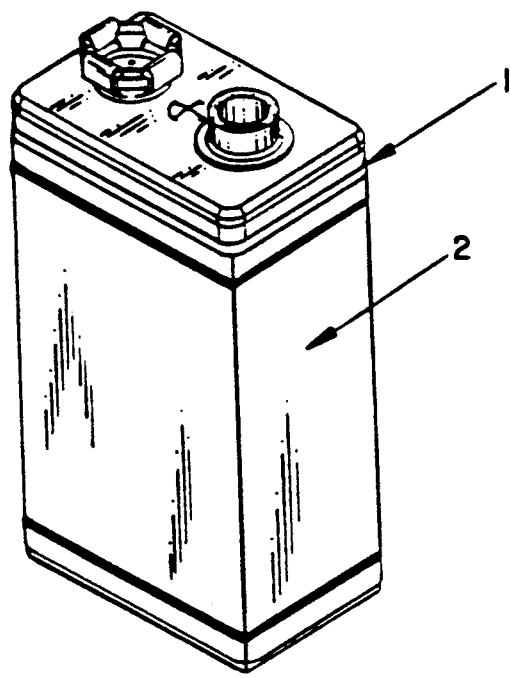
FIG. 1 is a three-dimensional view of a plastic battery housing 1 having a metal foil lamination 2 heat-sealed to the housing.
Figure 2:
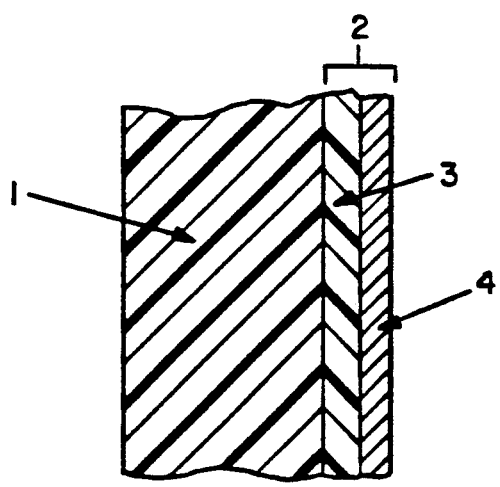
FIG. 2 is a detailed cross-section of battery housing 1 having heat sealed thereto a metal foil lamination 2 consisting of the foil 4 and a heat-sealable thermoplastic layer 3.

Referring to FIG. 2, a metal foil lamination of 0.01 to 0.10 mm, preferably 0.025 mm (0.001 inch) thick aluminum foil 4 is heat laminated to 0.05 mm (0.002 inch) thick modified thermoplastic adhesive film 3. The preferred adhesive is thermoplastic propylene-ethylene elastomer-acrylic acid terpolymer 75:19:6 percent composition by weight respectively, commercially available as POLYBOND 1016 (BP Performance Polymers, Hackettstown, N.J.). However, any thermoplastic resin which adheres to the metal foil and is heat-sealable to the plastic battery housing may be used. Other useful thermoplastic resins include propylene-acrylic acid copolymer; ethylene-acrylic acid copolymer; ethylene-methacrylic acid copolymer; ethylene-ethyl acrylate copolymer; ionomer.

Copper, stainless-steel, nickel or other metal foils may also be used. The metal foil may be of any thickness, however it should be sufficiently thick to be free of pinholes and other defects yet thin enough to conform to the battery housing. Preferred foil thicknesses are 0.01 to 0.10 mm.

One method of applying the foil laminate to the battery housing is as follows. A sheet of 0.06 mm (1/16-inch) silicone rubber is placed on the heating surface of a laboratory hot plate. The hot plate control is adjusted to 662.4° C. (400° F.) as measured with a thermocouple on the surface of the silicone rubber. The foil laminate is positioned on one face of the battery housing with the foil 4 to the outside. This face of the battery is then pressed against the silicone rubber for several seconds or long enough to melt the thermoplastic layer 3 of the laminate causing it to fuse to the plastic battery housing 1.

Figure 3:
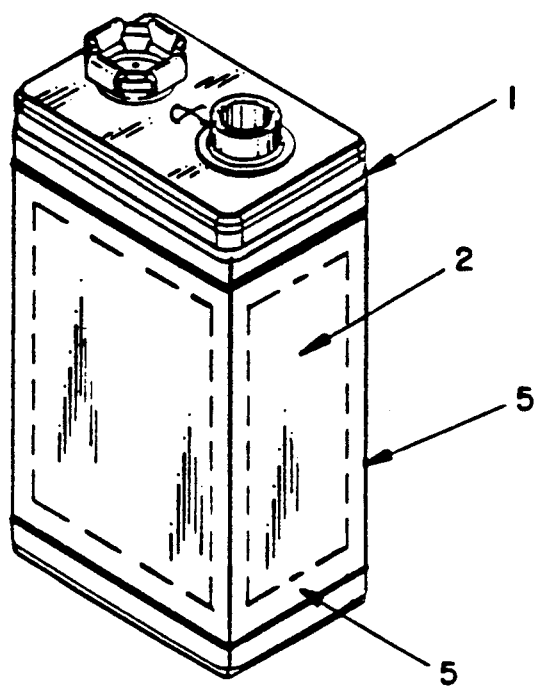
FIG. 3 is a plastic housing with metal foil laminate heat-sealed at only the peripheral edges 5 of the housing.

Alternatively, only the peripheral seams 5 shown in FIG. 3 of the foil laminate are heat-sealed to the battery.

Induction heating and ultrasonic welding can be effective in melting the thermoplastic layer 3 to fuse it to the battery housing 1.

Figure 5:
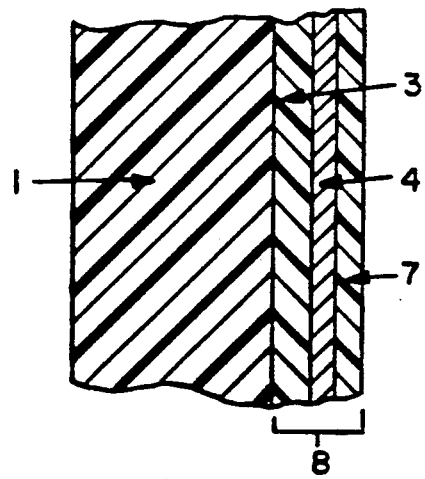
FIG. 5 is a detailed cross-section of battery housing 1 having adhered thereto a three-layer laminate 8 consisting of foil 4, inner heat-sealable thermoplastic layer 3 and outer thermoplastic layer 7.

The foil laminate 2 may also consist of three layers as shown in FIG. 5. In addition to the thermoplastic layer 3 and foil 4 an outer thermoplastic layer 7 added during the foil lamination process will protect the foil from corrosive materials and will electrically insulate the foil. Preferably the outer layer is a thermoplastic material with a higher melting temperature than thermoplastic layer 3 used to adhere the metal foil to the battery. Examples of such materials include thermoplastic polyester and thermoplastic polyamide.

Figure 4:
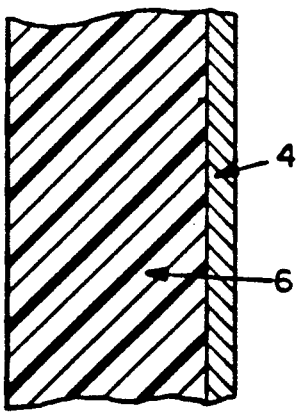
FIG. 4 is a detailed cross-section of heat-sealable thermoplastic adhesive battery housing 6 and foil 4.

It is also possible to adhere the metal foil 4 directly to the battery housing 6 as shown in FIG. 4. In this embodiment the plastic housing is constructed of a thermoplastic material that adheres to the foil upon application of heat and pressure. POLYBOND 1016 is one such material. Another useful material is thermoplastic propylene-acrylic acid copolymer (POLYBOND 1001, BP Performance Polymers, Hackettstown, N.J.).

The following examples illustrate the advantages provided by the present invention.

EXAMPLE 1

A 10 cm × 10 cm (4-inch by 4-inch) piece of 0.025 mm (0.001 inch) thick solid aluminum foil was placed on the lower platen of a temperature controlled hydraulic press. The upper and lower platen temperatures were 662.4° C. (400° F.). A 10 cm × 10 cm (4-inch by 4-inch) piece of 0.054 mm (0.002 inch) thick POLYBOND 1016 film was placed on the foil. The platens were closed to a pressure of 6895 kPa (1,000 psi) for one minute, after which the platens were opened and the metal foil/POLYBOND lamination was removed:

Plastic battery housings suitable for standard 9 volt batteries were prepared by injecting 4.5 grams of dry electrolyte into each of the 3 cavities and then hermetically sealing the housing. The plastic battery housings are of the type described in U.S. Pat. No. 4,719,159. The electrolyte was 60% propylene carbonate/40% 1,3-dioxolane by weight containing 0.8 molar lithium hexafluroarsenate salt.

A laboratory hot plate adjusted to 662.4° C. (400° F.) surface temperature and having a 0.06 mm (1/16-inch) thick silicone rubber pad on the heating surface was used to heat-seal the foil laminate to the battery housing. The foil laminate was placed on the battery so as to cover the four sides, then one side of the battery was pressed into the silicone pad for two seconds, repeating for each side.

Three housings with heat-sealed foil lamination and three without were then placed into an environmental chamber at 45° C. and 95% relative humidity. After 6 days the electrolyte water content of each housing was determined by Karl-Fischer titration.

| Test Group | Electrolyte Water Content | |
|---|---|---|
| | 0 Days | 6 Days |
| Housing with metal foil laminate | 26 ppm | 389 ppm |
| Housing without metal laminate | 26 ppm | 701 ppm |

The housing with the metal foil laminate of the invention reduced the overall rate of water permeation into the battery housing by 46%.

EXAMPLE 2

Two groups of lithium 9-volt batteries, A and B, were constructed. The batteries were prepared as described in U.S. Pat. No. 4,719,159. Batteries in group A (present invention) had an aluminum foil/POLYBOND laminate heat-sealed to four sides of the housing as in example 1. Batteries in group B were covered on four sides with a 0.054 mm (0.002 inch) thick aluminum foil coated with 0.054 mm (0.002 inch) of an acrylic pressure sensitive adhesive. Both groups of batteries were then placed into an environmental chamber at 60° C. and 100% relative humidity. The 100 Hz AC impedance of the batteries was periodically measured. The batteries of the present invention (group A) suffered much less increase in impedance than batteries in group B. Since an increase of AC impedance results in degradation of battery performance when discharged, this shows that the acrylic pressure sensitive adhesive was much less effective than an thermoplastic adhesive required by the present invention.

| Test Group | 100 Hz AC Impedance | | | | |
|---|---|---|---|---|---|
| | 0 Days | 5 Days | 10 Days | 15 Days | 20 Days |
| Group A | 4 ohms | 5 ohms | 7 ohms | 12 ohms | 17 ohms |
| Group B | 4 ohms | 11 ohms | 31 ohms | 78 ohms | 113 ohms |

The invention has been described in detail with particular reference to preferred embodiments thereof, but it will be understood that variations and modifications can be effected within the spirit and scope of the invention.

We claim:

1. A battery having a pinhole-free metallic foil coated rigid plastic housing wherein the foil is adhered to the plastic housing with a thermoplastic resin that is capable of adhering to the metal foil and is heat sealable to the plastic housing.

2. A battery of claim 1 further comprising a non-aqueous electrolyte.

3. A battery of claim 2 further comprising a lithium anode.

4. A battery having a pinhole-free metallic foil coated rigid plastic housing wherein the outer surface of the metal foil layer is coated with a thermoplastic material.

5. A battery of claim 4 further comprising a non-aqueous electrolyte.

6. A battery of claim 5 further comprising a lithium anode.

* * * * *